US012723129B2

(12) United States Patent
Farmand-Ashtiani et al.

(10) Patent No.: US 12,723,129 B2
(45) Date of Patent: Sep. 1, 2026

(54) ONE COMPONENT POLYMERIZABLE COMPOSITION FOR TRICKLE IMPREGNATION

(71) Applicant: Huntsman Advanced Materials Licensing (Switzerland) GmbH, Basel (CH)

(72) Inventors: Ebrahim Farmand-Ashtiani, Basel (CH); Cristina Garcia Simon, Basel (CH); Christian Beisele, Basel (CH); Giuseppe Lisa, Basel (CH); Florian Gnaedinger, Basel (CH); Alessandro Napoli, Basel (CH)

(73) Assignee: HUNTSMAN ADVANCED MATERIALS (Switzerland) GmbH, Basel (CH)

( * ) Notice: Subject to any disclaimer, the term of this patent is extended or adjusted under 35 U.S.C. 154(b) by 441 days.

(21) Appl. No.: 18/276,537

(22) PCT Filed: Feb. 24, 2022

(86) PCT No.: PCT/EP2022/054697

§ 371 (c)(1),
(2) Date: Aug. 9, 2023

(87) PCT Pub. No.: WO2022/180175

PCT Pub. Date: Sep. 1, 2022

(65) Prior Publication Data

US 2024/0150518 A1 May 9, 2024

(30) Foreign Application Priority Data

Feb. 25, 2021 (EP) .................................... 21159434
Jun. 18, 2021 (EP) .................................... 21180401

(51) Int. Cl.

| | |
|---|---|
| ***C08G 59/40*** | (2006.01) |
| ***C08G 59/24*** | (2006.01) |
| ***C08G 59/68*** | (2006.01) |
| ***C09D 163/00*** | (2006.01) |
| ***C09J 5/00*** | (2006.01) |
| ***C09J 163/00*** | (2006.01) |
| ***H02K 3/30*** | (2006.01) |

(52) U.S. Cl.
CPC ....... *C08G 59/4021* (2013.01); *C08G 59/245* (2013.01); *C08G 59/686* (2013.01); *C08G 59/688* (2013.01); *C09D 163/00* (2013.01); *C09J 5/00* (2013.01); *C09J 163/00* (2013.01); *H02K 3/30* (2013.01); *C09J 2465/00* (2013.01)

(58) Field of Classification Search
CPC .............. C08G 59/245; C08G 59/4021; C08G 59/5026; C08G 59/504; C08G 59/686; C08G 59/688; C09J 163/00; C09J 2465/00; C09J 5/00; H02K 3/30; C09D 163/00
See application file for complete search history.

(56) References Cited

U.S. PATENT DOCUMENTS

| | | | |
|---|---|---|---|
| 3,654,370 | A | 4/1972 | Yeakey |
| 4,283,520 | A | 8/1981 | Moser et al. |
| 5,130,463 | A | 7/1992 | Haubennestel et al. |
| 5,476,748 | A | 12/1995 | Steinmann et al. |
| 5,639,413 | A | 6/1997 | Crivello |
| 5,972,563 | A | 10/1999 | Steinmann et al. |
| 6,348,513 | B1 | 2/2002 | Hilborn et al. |
| 6,376,564 | B1 | 4/2002 | Harrison |
| 6,506,494 | B2 | 1/2003 | Brandys et al. |
| 6,555,601 | B1 | 4/2003 | Behm et al. |
| 6,632,893 | B2 | 10/2003 | Konarski et al. |
| 8,440,746 | B2 | 5/2013 | Swarup et al. |
| 8,742,018 | B2 | 6/2014 | Reynolds et al. |
| 2015/0002254 | A1 | 1/2015 | Beigel et al. |
| 2018/0119250 | A1 | 5/2018 | Zhou et al. |
| 2020/0223977 | A1 | 7/2020 | Napoli et al. |

FOREIGN PATENT DOCUMENTS

| | | | | |
|---|---|---|---|---|
| CN | 103764709 A | 4/2014 | | |
| CN | 107580615 A | 1/2018 | | |
| CN | 110114382 A | 8/2019 | | |
| EP | 0940418 A2 * | 9/1999 | ............. | C08G 59/44 |
| RU | 2078093 C1 | 4/1997 | | |
| RU | 95102131 A | 6/1997 | | |
| WO | WO-2018119250 A1 * | 6/2018 | ........... | C08G 59/686 |

OTHER PUBLICATIONS

PCT International Search Report and Written Opinion mailed Jun. 7, 2022 in OCT Application No. PCT/EP2022/054697.
Communication under Rule 71(3) EPC issued Sep. 19, 2024 in corresponding application No. 22707460.6.
Taiwan Search Report issued issued Sep. 19, 2025 in corresponding application No. 111107144 translation of.

* cited by examiner

*Primary Examiner* — Yan Lan
(74) *Attorney, Agent, or Firm* — HUNTSMAN ADVANCED MATERIALS (Switzerland) GmbH

(57) ABSTRACT

The present disclosure generally relates to a one component epoxy resin-based composition including an epoxy resin, a reactive diluent, a cyanoacetamide derived from a cycloaliphatic-type diamine and a polyoxyalkylene amine, a protected base in the form of an adduct or salt which can release a base upon heating at a temperature of greater than about 50° C. and a polyacid and its use in trickle impregnation processes.

18 Claims, No Drawings

ONE COMPONENT POLYMERIZABLE COMPOSITION FOR TRICKLE IMPREGNATION

CROSS-REFERENCE TO RELATED APPLICATIONS

This application is a national phase of International Application No. PCT/US2022/054697 filed Feb. 24, 2022, which designates the U.S and claims priority to EP Application Serial No. 21159434.6 filed on Feb. 25, 2021 and EP Application Serial No. 21180401.8 filed on Jun. 18, 2021. The noted applications are incorporated herein by reference.

FIELD

The present disclosure generally relates to a storage stable at ambient temperature, and in some embodiments CMR-free (i.e., it does not contain Carcinogenic, Mutagenic toxic to Reproduction substances) epoxy resin-based composition, which can be transported in industrial scale volumes without need for cooling and its use in impregnating electric motors, generators and transformers in trickle impregnation, hot dip rolling and vacuum impregnation processes.

BACKGROUND

Resin impregnation of wire coils of rotors or stators is an important process in the production of electric motors. Conventional methods of impregnation are trickle impregnation and dip impregnation using solvent-less based insulation resins. In trickle impregnation, the insulation resin is dripped onto a heated winding that rotates at a moderate speed until complete impregnation is achieved. The subsequent cure of the resin can be realized at cold or at elevated temperature, depending on the resin employed. In dip impregnation, the rotor or stator is preheated and then fixed on an apparatus and dipped, while rotating, into an impregnating bath filled with the insulation resin. After complete impregnation of the windings, the rotor or stator is removed from the impregnating bath while continuing to rotate until the resin has gelled. In some instances, it may be necessary to perform a post cure in an oven to fully cure the resin.

Unsaturated polyester resins and epoxy resins are often used in one component insulation resin systems for trickle impregnation and dip impregnation processes. However, these current state of the art resin systems either lack sufficient storage stability, are too viscous, have poor adhesion to primary insulation layers, have too low of a glass transition temperature making them unsuitable for high temperature applications or contain toxic materials.

Accordingly, a need exists for the development of alternative non-toxic insulation resin systems that are capable of being used in trickle and dip impregnation processes (requiring that the resins have moderate viscosity at ambient temperature and low viscosity at application temperatures) and that exhibit good impregnation capability, good adhesion to primary insulation layers, have a fast reactivity and are storage stable for an extended period of time.

SUMMARY

The present disclosure generally provides a one-component epoxy resin-based composition including: (a) an epoxy resin; (b) a reactive diluent; (c) a cyanoacetamide derived from a cycloaliphatic-type diamine and a polyoxyalkylene amine; (d) a protected base in the form of an adduct or salt which can release a base upon heating at a temperature greater than about 50° C.; and (e) a polyacid In still another embodiment, there is provided the use of the one-component epoxy resin-based composition as an impregnating or coating composition for electrical motors, transformers and generator.

In another embodiment there is provided a process of forming an impregnated substrate including the steps of applying the one component epoxy resin-based composition of the present disclosure onto a substrate by dip impregnation, vacuum impregnation or trickle impregnation to form an impregnated substrate and curing the applied composition.

DETAILED DESCRIPTION

The present disclosure is generally directed to a one-component epoxy resin-based composition containing an epoxy resin, a reactive diluent, a cyanoacetamide derived from a cycloaliphatic-type diamine and a polyoxyalkylene amine, a protected base in the form of an adduct or salt which can release a base upon heating at a temperature of greater than about 50° C. and a polyacid. The one-component epoxy resin-based composition of the present disclosure has surprisingly been found to have high reactivity at 130° C. resulting in a high glass transition temperature (Tg), provides good wetting of and adhesion to primary insulation materials and is therefore especially useful as a secondary insulation material for wound conductors (for e.g. stators and rotors of electrical motors, transformers and generators). In addition, when formulated in one part, the epoxy resin-based compositions of the present disclosure possesses excellent storage stability at ambient temperature, particularly with respect to viscosity and crystallization resistance over an extended period of time. Because the one-component epoxy resin-based composition also exhibits a low viscosity at application temperatures of about 90° C. to about 120° C., it may be particularly useful in trickle and dip impregnation processes. Finally, the one-component epoxy resin-based composition of the present disclosure is CMR-free and H361-free making it highly environmentally friendly.

The following terms shall have the following meanings:

The term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, except those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical objects of the article. By way of example, "an epoxy resin" means one epoxy resin or more than one epoxy resin. The phrases "in one embodiment", "according to one embodiment" and the like generally mean the particular feature, structure, or characteristic following the phrase is included in at least one embodiment of the present disclosure and may be included in more than one embodiment of the present disclosure. Importantly, such phrases do not necessarily refer to the same aspect. If the specification states a component or feature "may", "can", "could", or "might" be included or have a characteristic, that particular component or feature is not required to be included or have the characteristic.

The term "about" as used herein can allow for a degree of variability in a value or range, for example, it may be within 10%, within 5%, or within 1% of a stated value or of a stated limit of a range.

Values expressed in a range format should be interpreted in a flexible manner to include not only the numerical values explicitly recited as the limits of the range, but to also include all of the individual numerical values or sub-ranges encompassed within that range as if each numerical value and sub-range is explicitly recited. For example, a range such as from 1 to 6, should be considered to have specifically disclosed sub-ranges, such as, from 1 to 3, from 2 to 4, from 3 to 6, etc., as well as individual numbers within that range, for example, 1, 2, 3, 4, 5, and 6. This applies regardless of the breadth of the range.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the present disclosure.

The term the "one-component" composition, "one component composition", or "one-part" composition refers to a composition which is contained in a single container, preferably a moisture-tight container, and which composition has certain storage stability. The term "two-component" composition refers to compositions where two components (A and B) are physically separated from each other (for instance, in separate cartridges, compartments, totes, drums or other containers), wherein components A and B are physically combined (admixed) at the time the composition is to be used to form a cured resin.

The term "storage stability" refers to the ability of a composition to be stored at ambient temperature in a suitable container under exclusion of moisture for a certain time interval, such as at least three months or at least four months or at least five months or at least six months, without undergoing significant changes in application or end-use properties (for e.g. with minor (less than about 5% or less than about 4% or less than about 3%) or no crystallisation and/or with minor (less than about 5% or less than about 4% or less than about 3%) or no increase in viscosity).

The term "ambient temperature" refers to the temperature of the surrounding work environment (e.g., the temperature of the area, building or room where the composition is used), exclusive of any temperature changes that occur as a result of the direct application of heat to the composition to facilitate curing. The ambient temperature may be within a range from about 10° C. to about 30° C., more specifically from about 15° C. to about 25° C.

The term "in the range" or "within a range" (and similar statements) includes the endpoints of the stated range.

The term "primary insulation" refers to electrical insulation, i.e. insulation that does not conduct electricity. Primary insulation may include, but is not limited to, polysulfone, polyphyenylsulfone ("PP SU"), polysulfide, polyphenylene sulfide ("PPS"), polyetherketone ("PEK"), polyether-etherketone ("PEEK"), polyaryletherketone ("PAEK"), polyamide etherketone, thermoplastic polyimide and aromatic polyamide, Where substituent groups are specified by their conventional chemical formula, written from left to right, they equally encompass the chemically identical substituents that would result from writing the structure from right to left, for example, —$CH_2O$— is equivalent to —$OCH_2$—.

The term "optional" or "optionally" means that the subsequently described event or circumstance may or may not occur, and that the description includes instances where said event or circumstance occurs and instances where it does not.

According to one embodiment, the present disclosure is directed to a one-component epoxy resin-based composition including: (a) an epoxy resin; (b) a reactive diluent; (c) a cyanoacetamide derived from a cycloaliphatic-type diamine and a polyoxyalkylene amine; (d) a protected base in the form of an adduct or salt which can release a base upon heating at a temperature greater than about 50° C.; (e) a polyacid; and optionally (f) one or more additives.

In general, any epoxy-containing compound is suitable for use as the epoxy resin in the present disclosure, such as the epoxy-containing compounds disclosed in U.S. Pat. Nos. 5,476,748; 6,506,494; 6,632,893; 6,376,564; 6,348,513; 8,742,018; and 8,440,746, which are incorporated herein by reference. The epoxy resin can be aliphatic, cycloaliphatic, heterocyclic, aromatic, hydrogenated, or mixtures thereof. In some embodiments, the epoxy resin contains on average more than 1.5 epoxy groups per molecule and preferably at least 2 epoxy groups per molecule. The epoxy resin may also have a weight average molecular weight of between about 150 to about 10,000 g/eq or between about 180 to about 1,000 g/eq.

In one embodiment, the epoxy resin may be a polyglycidyl epoxy compound. The polyglycidyl epoxy compound may be a polyglycidyl ether, poly(β-methylglycidyl) ether, polyglycidyl ester or poly(β-methylglycidyl) ester. The synthesis and examples of polyglycidyl ethers, poly(β-methylglycidyl) ethers, polyglycidyl esters and poly(β-methylglycidyl) esters are disclosed in U.S. Pat. No. 5,972,563 which is incorporated herein by reference. For example, the glycidyl ethers may be obtained by reacting a compound having at least one free alcoholic hydroxyl group and/or phenolic hydroxyl group with a suitably substituted epichlorohydrin under alkaline conditions or in the presence of an acidic catalyst followed by alkali treatment. The hydroxy group containing compounds may be, for example, acyclic alcohols, such as ethylene glycol, diethylene glycol and higher poly(oxyethylene) glycols, propane-1,2-diol, or poly(oxypropylene) glycols, propane-1,3-diol, butane-1,4-diol, poly (oxytetramethylene) glycols, pentane-1,5-diol, hexane-1,6-diol, hexane-2,4,6-triol, glycerol, 1,1,1-trimethylolpropane, bistrimethylolpropane, pentaerythritol and sorbitol. Suitable glycidyl ethers may also be obtained, however, from cycloaliphatic alcohols, such as 1,3- or 1,4-dihydroxycyclohexane, bis(4-hydroxycyclo-hexyl)methane, 2,2-bis(4-hydroxycyclohexyl)propane or 1,1-bis(hydroxymethyl)cyclohex-3-ene, or they may possess aromatic rings, such as N,N-bis (2-hydroxyethyl)aniline or p,p'-bis(2-hydroxyethylamino) diphenylmethane.

Particularly important representatives of polyglycidyl ethers or poly(β-methylglycidyl)ethers are based on monocyclic phenols, for example, on resorcinol or hydroquinone, on polycyclic phenols, for example, on bis(4-hydroxyphenyl)methane (Bisphenol F), 2,2-bis(4-hydroxyphenyl)propane (Bisphenol A), bis(4-hydroxyphenyl)sulfone (Bisphenol S), alkoxylated Bisphenol A, F or S, triol extended Bisphenol A, F or S, brominated Bisphenol A, F or S, hydrogenated Bisphenol A, F or S, glycidyl ethers of phenols and phenols with pendant groups or chains, on condensation products, obtained under acidic conditions, of phenols or cresols with formaldehyde, such as bisphenol A novolaks and cresol novolaks, or on siloxane diglycidyls.

Polyglycidyl esters and poly(β-methylglycidyl)esters may be produced by reacting epichlorohydrin or glycerol dichlorohydrin or β-methylepichlorohydrin with a polycarboxylic acid compound. The reaction is expediently carried out in the presence of bases. The polycarboxylic acid compounds may be, for example, glutaric acid, adipic acid, pimelic acid, suberic acid, azelaic acid, sebacic acid or dimerized or trimerized linoleic acid. Likewise, however, it is also possible to employ cycloaliphatic polycarboxylic acids, for example tetrahydrophthalic acid, 4-methyltetrahydrophthalic acid, hexahydrophthalic acid or 4-methylhexahydrophthalic acid. It is also possible to use aromatic polycarboxylic acids such as, for example, phthalic acid, isophthalic acid, trimellitic acid or pyromellitic acid, or else carboxyl-terminated adducts, for example of trimellitic acid and polyols, for example glycerol or 2,2-bis(4-hydroxycyclohexyl)propane, may be used.

In another embodiment, the epoxy resin may be a non-glycidyl epoxy compound. Non-glycidyl epoxy compounds may be linear, branched, or cyclic in structure. For example, there may be included one or more epoxy compounds in which the epoxide groups form part of an alicyclic or heterocyclic ring system. Others include an epoxy-containing compound with at least one epoxycyclohexyl group that is bonded directly or indirectly to a group containing at least one silicon atom. Examples are disclosed in U.S. Pat. No. 5,639,413, which is incorporated herein by reference. Still others include epoxides which contain one or more cyclohexene oxide groups and epoxides which contain one or more cyclopentene oxide groups.

Particular examples of non-glycidyl epoxy compounds include the following: difunctional non-glycidyl epoxide compounds in which the epoxide groups form part of an alicyclic or heterocyclic ring system: bis(2,3-epoxycyclopentyl)ether, 1,2-bis(2,3-epoxycyclopentyloxy)ethane, 3,4-epoxycyclohexyl-methyl 3,4-epoxycyclohexanecarboxylate, 3,4-epoxy-6-methyl-cyclohexylmethyl 3,4-epoxy-6-methylcyclohexanecarboxylate, di(3,4-epoxycyclohexylmethyl)hexanedioate, di(3,4-epoxy-6-methylcyclohexylmethyl) hexanedioate, ethylenebis(3,4-epoxycyclohexanecarboxylate) and ethanediol di(3,4-epoxycyclohexylmethyl.

In some particular embodiments, the difunctional non-glycidyl epoxy compounds include cycloaliphatic difunctional non-glycidyl epoxies, such as 3,4-epoxycyclohexyl-methyl 3',4'-epoxycyclohexanecarboxylate and 2,2'-bis-(3,4-epoxy-cyclohexyl)-propane, with the former being most preferred.

In another embodiment, the epoxy resin is an epoxidation product of unsaturated fatty acid esters. It is preferable to use epoxy-containing compounds derived from mono- and poly-fatty acids having from 12 to 22 carbon atoms and an iodine number of from 30 to 400, for example lauroleic acid, myristoleic acid, palmitoleic acid, oleic acid, gadoleic acid, erucic acid, ricinoleic acid, linoleic acid, linolenic acid, elaidic acid, licanic acid, arachidonic acid and clupanodonic acid. For example, the epoxidation products of the following are suitable: soybean oil, linseed oil, perilla oil, tung oil, oiticica oil, safflower oil, poppyseed oil, hemp oil, cottonseed oil, sunflower oil, rapeseed oil, polyunsaturated triglycerides, triglycerides from euphorbia plants, groundnut oil, olive oil, olive kernel oil, almond oil, kapok oil, hazelnut oil, apricot kernel oil, beechnut oil, lupin oil, maize oil, sesame oil, grapeseed oil, lallemantia oil, castor oil, herring oil, sardine oil, menhaden oil, whale oil, tall oil and derivatives thereof. Also suitable are higher unsaturated derivatives that can be obtained by subsequent dehydrogenation reactions of those oils. The olefinic double bonds of the unsaturated fatty acid radicals of the above-mentioned compounds can be epoxidized in accordance with known methods, for example by reaction with hydrogen peroxide, optionally in the presence of a catalyst, an alkyl hydroperoxide or a peracid, for example performic acid or peracetic acid. Within the scope of this disclosure, both the fully epoxidized oils and the partially epoxidized derivatives that still contain free double bonds can be used as the epoxy resin.

In yet another aspect, the epoxy resin may be a poly(N-glycidyl) compound or poly(S-glycidyl) compound. Poly(N-glycidyl) compounds are obtainable, for example, by dehydrochlorination of the reaction products of epichlorohydrin with amines containing at least two amine hydrogen atoms. These amines may be, for example, n-butylamine, aniline, toluidine, m-xylylenediamine, bis(4-aminophenyl)methane or bis(4-methylaminophenyl)methane. Other examples of poly(N-glycidyl) compounds include N,N'-diglycidyl derivatives of cycloalkyleneureas, such as ethyleneurea or 1,3-propyleneurea, and N,N'-diglycidyl derivatives of hydantoins, such as of 5,5-dimethylhydantoin. Examples of poly(S-glycidyl) compounds are di-S-glycidyl derivatives derived from dithiols, for example ethane-1,2-dithiol or bis(4-mercaptomethylphenyl)ether.

It is also possible to employ epoxy resins in which the 1,2-epoxide groups are attached to different heteroatoms or functional groups. Examples include the N,N,O-triglycidyl derivative of 4-aminophenol, the glycidyl ether/glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

Other epoxide derivatives may also be employed as the epoxy resin, such as vinyl cyclohexene dioxide, limonene dioxide, limonene monoxide, vinyl cyclohexene monoxide, 3,4-epoxycyclohexlmethyl acrylate, 3,4-epoxy-6-methyl cyclohexylmethyl 9,10-epoxystearate, and 1,2-bis(2,3-epoxy-2-methylpropoxy)ethane.

Additionally, the epoxy resin may be a pre-reacted adduct of an epoxy resin, such as those mentioned above, with compounds having a free hydrogen that is reactive with an epoxy group. Typically, such reactive hydrogens are found in carboxylic acid groups, aromatic hydroxyl groups, amino groups, and sulfhydryl groups.

In one particular embodiment, the one-component epoxy resin-based composition may contain only one epoxy resin while in other embodiments, it may contain a mixture of epoxy resins.

In one embodiment, the epoxy resin may be included in the one component epoxy resin-based composition in an amount within a range from about 40% by wt. to about 70% by wt., based on the total weight of the one component epoxy resin-based composition. In still another embodiment, the epoxy resin may be included in the one component epoxy resin-based composition in an amount within a range from about 45% by wt. to about 65% by wt. or from about 47.5% by wt. to about 62.5% by wt. or from about 50% by wt. to about 60% by wt., based on the total weight of the one component epoxy resin-based composition.

In another embodiment, the one component epoxy resin-based composition includes a reactive diluent. As used herein, a “reactive diluent” includes any compound which is completely soluble, reactive and, when combined with the other components of the one component epoxy resin-based composition, is capable of reducing the composition's viscosity.

In one embodiment, the reactive diluent is an epoxy reactive diluent. The epoxy reactive diluents are mono- and polyepoxides such as, for example, glycidyl ethers of monohydric or polyhydric phenols and aliphatic or cycloaliphatic alcohols, such as in particular glycidyl ethers of monools, diols or polyols, as well as also in particular phenyl glycidyl ether, cresyl glycidyl ether, p-n-butyl phenyl glycidyl ether, p-tert butyl phenyl glycidyl ether, nonylphenyl glycidyl ether, allyl glycidyl ether, butyl glycidyl ether, hexyl glycidyl ether, 2-ethylhexyl glycidyl ether, glycidyl ester of a synthetic saturated monocarboxylic acid of highly branched $C_{10}$ isomers and glycidyl ethers of natural alcohols such as, for example, $C_8$ to $C_{10}$ alkyl glycidyl ethers or $C_{12}$ to $C_{14}$ alkyl glycidyl ethers; 1,4-butanediol diglycidylether, 1,6-hexanediol diglycidylether, cyclohexane dimethanol diglycidylether, neopentylglycol diglycidylether, polypropylene glycol diglycidylether; glycerol triglycidylether, trimethylolpropane triglycidylether, polyoxypropylene glycol triglycidylether, triglycidyl ether of castor oil, polyglycerol triglycidylether; and pentaerythritol tetraglycidether.

In one embodiment, the reactive diluent may be included in the one component epoxy resin-based composition in an amount within a range from about 10% by wt. to about 40% by wt., based on the total weight of the one component epoxy resin-based composition. In still another embodiment, the reactive diluent may be included in the one component epoxy resin-based composition in an amount within a range from about 12% by wt. to about 35% by wt. or from about 15% by wt. to about 25% by wt. or from about 17% by wt. to about 22% by wt., based on the total weight of the one component epoxy resin-based composition.

The one component epoxy resin-based composition also includes a cyanoacetamide derived from a cycloaliphatic-type diamine and a polyoxyalkylene amine.

In one embodiment, the cycloaliphatic-type diamine is a norbornane-type diamine and is a compound having the formula

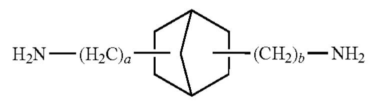

where a and b are an integer within a range from 0 to 2 with the proviso that a+b=2. In one embodiment, the norbornane-type diamine is norbornane diamine, bis(aminomethyl)norbornane or bis(aminoethyl)norbornane. In still another embodiment, the norbornane-type diamine is 2,5-bis(aminomethyl)norbornane or 2,6-bis(aminomethyl)norbornane or a mixture thereof.

In another embodiment the cycloaliphatic-type diamine may be bis(4-amino-3-methylcyclohexyl)methane, bis(4-aminocyclohexyl)methane, bis(4-amino-3-ethylcyclohexyl) methane, bis(4-amino-3,5-dimethylcyclohexyl)methane, 1,3-diaminocyclohexane, 1,4-diaminocyclohexane, isophoronediamine, 1,3-bis(aminomethyl)cyclohexane, 1,4-bis (aminomethyl)cyclohexane or 2,2-(4,4'-diaminodicyclohexyl)propane. octahydro-4,7-methano-1H-indene-5,-dimethylamine.

In one embodiment, the polyoxyalkylene amine is a polyoxyalkylene monoamine. The polyoxyalkylene monoamine is a compound containing one amino group that is attached to the terminus of a polyether backbone. The amino group may be a primary (—$NH_2$) or a secondary (—NH—) amino group. In one embodiment, the amino group is a primary amino group. As further discussed below, the polyether backbone is based on, i.e., further defined by, alkylene oxide groups, such as propylene oxide (PO), ethylene oxide (EO), butylene oxide (BO) and mixtures thereof. In mixed structures, the ratios can be in any desired ratio and may be arranged in blocks (for e.g. repeating or alternating) or randomly distributed. In one non-limiting example, in a mixed EO/PO structure, the ratio of EO:PO can range from about 1:1 to about 1:50 and vice-versa. As such, the polyoxyalkylene monoamine may substantially define a polyethylene oxide, polypropylene oxide, and/or a polybutylene oxide. The molecular weights of the polyoxyalkylene monoamines can vary and may range up to a molecular weight of about 6,000.

The polyoxyalkylene monoamine may generally be prepared by reaction of a monohydric initiator, for e.g. an alcohol, with ethylene and/or propylene oxide and/or butylene oxide. This reaction is followed by conversion of the resulting terminal hydroxyl group to an amine, thereby providing a polyether backbone which includes propylene oxide (PO), ethylene oxide (EO), butylene oxide (BO) or mixtures thereof, and a terminal amino group, for e.g., a terminal primary amino group or a terminal secondary amino group, preferably a primary amino group. According to one embodiment, the alcohol may be an aliphatic having 1-35 carbon atoms or aromatic alcohol having from 6-35 carbon atoms, both of which may be further substituted with moieties such as alkyl, aryl, arylalkyl and alkaryl substituents. In another embodiment, the alcohol is an alkanol having 1-18 carbon atoms, or 1-10 carbon atoms, such as lower alkyl derived alkanols including for example, methanol, ethanol, propanol, butanol, isopropanol, sec-butanol and the like. In another embodiment, the alcohol may be an alkylphenol where the alkyl substituent is a straight or branched chain alkyl of from 1-24 carbon atoms such as from 4-16 carbon atoms, or an aryl substituted phenol including mono-di- and tri-phenyl-phenol, or an alkaryl phenol, or an arylalkylphenol such as tri-strylphenol, or naphthol, or an alkyl substituted naphthol.

According to one particular embodiment, the polyoxyalkylene monoamine is a compound having a general formula:

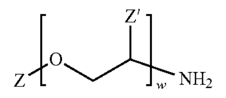

where Z is a $C_1$-$C_{40}$ alkyl group or a $C_1$-$C_{40}$ alkyl phenol group; each Z' is independently hydrogen, methyl or ethyl; and w is an integer in a range from about 1 to about 50. Particular examples include, but are not limited to compounds having the formulae:

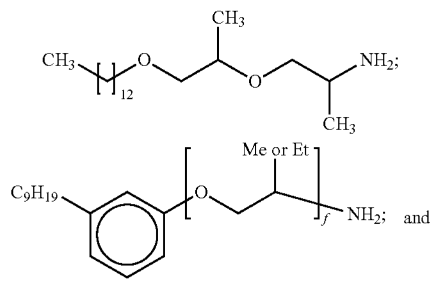

and

-continued

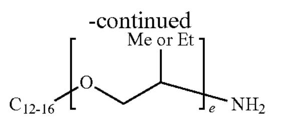

where Me is methyl and Et is ethyl; f is an integer within a range from about 13 to about 14; and e is an integer within a range from about 2 to about 3. Such polyoxyalkylene monoamines included within the above formulas include the JEFFAMINE® M-600, M-1000, M-2005, M-2070, FL-1000 (where f is 14 and Me or Et is methyl), C-300 (where e is about 2.5); XTJ-435 and XTJ-436 amines.

According to another embodiment, the polyoxyalkylene amine is a polyoxyalkylene diamine. Procedures for making polyoxyalkylene diamines are described in, for example, U.S. Pat. No. 3,654,370, the contents of which are incorporated herein by reference. In one particular embodiment, the polyoxyalkylene diamine is an amine terminated polyoxyalkylene diol. The polyether backbone for such polyoxyalkylene diols can include ethylene oxide, propylene oxide, butylene oxide or mixtures thereof and thus the polyoxyalkylene primary diamine may have a general formula

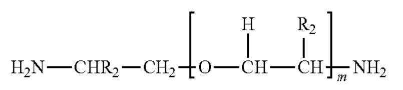

where m is an integer within a range from 2 to about 100 and each $R_2$ is independently hydrogen, methyl or ethyl. In some embodiments, each $R_2$ is independently hydrogen or methyl and m is an integer within a range from about 2 to about 70, or from about 2 to about 35 or from 2 to about 7. In other embodiments, each $R_2$ is independently hydrogen or methyl and m is an integer within a range from about 6 to about 70 or from about 6 to about 35. In still further embodiments, each $R_2$ is methyl and m is an integer in a range from 2 to about 70. Examples of these compounds include the JEFFAMINE® D-series amines available from Huntsman Petrochemical LLC, such as JEFFAMINE® D-230 amine where $R_2$ is methyl and m is about 2.6, and JEFFAMINE® D400 amine where $R_2$ is methyl and m is about 6.1, as well analogous compounds offered by other companies comprising polyoxyalkylene primary diamines.

In another embodiment, embodiment, the polyoxyalkylene diamine has a general formula

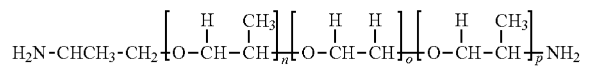

where n and p are each independently integers within a range from about 1 to about 10 and o is an integer within a range from about 2 to about 40. In some embodiments, o is an integer within a range from about 2 to about 40, or from about 2 to about 13 or from about 2 to about 10. In another embodiment, o is an integer within a range from about 9 to about 40, or from about 12 to about 40 or from about 15 to about 40, or even from about 25 to about 40. In other embodiments, n+p is an integer within a range from about 1 to about 6, or from about 1 to about 4 or from about 1 to about 3. In further embodiments, n+p is an integer within a range from about 2 to about 6 or from about 3 to about 6. Examples of these compounds include the JEFFAMINE® ED-series amines available from Huntsman Petrochemical LLC, as well analogous compounds offered by other companies comprising polyoxyalkylene primary diamines.

In still another embodiment, the polyoxyalkylene diamine may have the formula

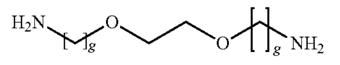

where g is an integer within a range from about 2 to about 3. Examples of these compounds include the JEFFAMINE® EDR-series amines available from Huntsman Petrochemical LLC, as well analogous compounds offered by other companies comprising polyoxyalkylene primary diamines.

In yet another embodiment, the polyoxyalkylene amine is a polyoxyalkylene triamine. The polyoxyalkylene triamine similarly can be ethylene oxide, propylene oxide or butylene oxide based, as well as mixtures thereof, and may be prepared by the reaction of such oxides with a triol initiator (for e.g. glycerin or trimethylolpropane), followed by amination of the terminal hydroxyl groups. In one embodiment the polyoxyalkylene triamine may have a general formula

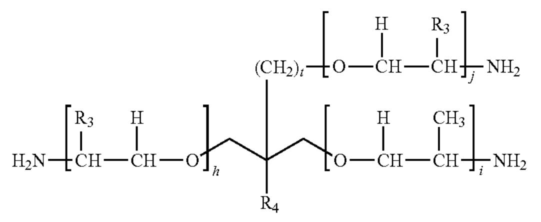

where each $R_3$ is independently hydrogen, methyl or ethyl, $R_4$ is hydrogen, methyl or ethyl, t is 0 or 1 and h, i and j independently are integers within a range from about 1 to about 100. In one embodiment, $R_4$ is hydrogen or ethyl. In another embodiment, each $R_3$ is independently hydrogen or methyl, and in some embodiments each $R_3$ is methyl. In still another embodiment, h+i+j is an integer within a range from about 1 to about 100 or from about 5 to about 85. Examples of these compounds include the JEFFAMINE® T-series amines available from Huntsman Petrochemical LLC, such as JEFFAMINE® T3000 where $R_3$ is methyl, $R_4$ is hydrogen, t is 0 and h+i+j is 50, as well analogous compounds offered by other companies comprising polyoxyalkylene primary triamines.

The cyanoacetamide of the present disclosure can be prepared by reacting the cycloaliphatic-type diamine and the polyoxyalkylene amine with an excess of cyanoacetic acid or a methyl or ethyl ester thereof. In one embodiment, the cycloaliphatic type-diamine and polyoxyalkylene amine may be present at a weight ratio within a range from about 60:40 to about 95:5 or from about 80:20 to about 95:5 resulting in a mixture of di-cyanoacetamides of both amines.

In one embodiment, the cyanoacetamide may be included in the one component epoxy resin-based composition in an amount within a range from about 10% by wt. to about 40% by wt., based on the total weight of the one component epoxy resin-based composition. In another embodiment, the cyanoacetamide may be included in the one component epoxy resin-based composition in an amount within the range from about 15% by wt. to about 35% by wt. or from about 20% by wt. to about 30% by wt., based on the total weight of the one component epoxy resin-based composition.

The one component epoxy resin-based composition further includes a protected base in the form of an adduct or salt which can release a base upon heating at a temperature of greater than about 50° C. The term "protected base" as used herein refers to all salts or adducts of a basic or nucleophilic compound which upon heating releases the free reactive basic or nucleophilic compound that is capable of deprotonating the cyanoacetamide thus reacting with the oxirane ring of the epoxy resin and initiating the curing reaction. Starting compounds for the preparation of the protected base may be, for example, aliphatic, araliphatic, aromatic or heterocyclic amines, guanidines and N-heterocyclic compounds which exhibit a $pK_a$ value of conjugated acid greater than 7.5 (in acetonitrile), preferably greater than 8.0, more preferably greater than 8.5, and in particular greater than 9.5, and which can be reversibly blocked by addition of a Bronsted or Lewis acid or an epoxide.

It is essential that upon heating to temperatures greater than 50° C., preferably greater than 85° C., and more preferably greater than 100° C., the blocking is reversed and a compound is released which is basic enough to deprotonate the cyanoacetamide thus reacting with the oxirane ring of the epoxide molecule and initiating the curing reaction.

Examples of such compounds are aliphatic amines such as ethylamine or dimethyloctylamine, urones such as N'-(4-chlorophenyl)-N,N-dimethylurea and N'-(3,4-dichlorophenyl)-N,N-dimethylurea, guanidines such as dicyandiamide and dicyandiamide/imidazoline salts, imidazoles such as 1-methylimidazole and 1-methyl-3-ethylimidazole and amidines such as 1,8-diazabicycloundec-7-ene (DBU), tertiary amines, such as tris-dimethylaminophenol.

Further examples of compounds which can be used as the protected base are alkali alkoxides and alkali phenolates.

In one embodiment the protected base is a urea derivative or an adduct or salt of an imidazole, or amidine derivative. Particularly preferred are adducts or salts of 1-methyl-3-ethylimidazole, 1,8-diazabicycloundec-7-ene (DBU) or 1,5-Diazabicyclo[4.3.0]non-5-ene (DBN).

Blocking agents which reduce the alkalinity of the organic nitrogen-containing compounds and which are released again at temperatures greater than 50° C. are Bronsted or Lewis acids or epoxides. Examples of Bronsted acids suitable as blocking agents are phenols such as phenol, o-, m- and p-cresol, bisphenol A and bisphenol F, a polyvinylphenol and carboxylic acids such as acetic acid, 2-ethylhexanoic acid, salicylic acid, trimellitic acid and ethylenediaminetetraacetic acid (EDTA).

Instead of the free acids, the corresponding anhydrides, for example, trimellitic anhydride, can be applied as well.

Suitable Lewis acids such as boron trihalogenides, preferably $BF_3$ and $BCl_3$, may be used.

Preferably, the composition according to this disclosure comprises as the protected base a phenol adduct or salt, a carboxylic acid salt, an epoxide adduct or a boron trihalide adduct of an organic nitrogen-containing compound. Particularly preferred are compositions comprising as the protected base an adduct of polyvinyl phenol, a salt of acetic acid, 2-ethylhexanoic acid, ethylenediaminetetraacetic acid, salicylic acid, trimellitic acid or a boron trifluoride or trichloride-adduct.

Furthermore, preferred compositions according to this disclosure comprise as the protected base a urea derivative or an adduct or salt of an imidazole or amidine derivative, for example an adduct or salt of 1-methyl-3-ethylimidazole or 1,8-diazabicycloundec-7-ene.

In another embodiment, examples of suitable protected bases are: imidazole salts such as 1-methylimidazole/acetic acid, 1-methylimidazole/2-ethylhexanoic acid and 1H-Imidazolium, 3-ethyl-1-methyl-, salt with N-cyanocyanamide (1:1); anidine salts such as DBU/phenol, DBU/m-cresol, DBU/o-cresol, DBU/p-cresol, DBU/acetic acid, DBU/trifluoroacetic acid, DBU/2-ethylhexanoic acid, DBU/EDTA and DBU/trimellitic acid; and amidine/boron trihalogenide adducts such as DBU/$BF_3$.

In some embodiments, the protected base is in the form of an adduct of a tertiary amine, such as tris-dimethylaminophenol and a phenol, such as a polyvinyl phenol and in further embodiments has an average particle size D50 of less than 30 microns. Average particle size D50 as used herein refers to a particle size at which the cumulative percentage of the particle volume accounts for 50%. The average particle size D50 can be measured using, for example, a laser diffraction/scattering particle size distribution analyzer.

In still another embodiment, the protected base is an ionic liquid. An ionic liquid refers generally to a class of poorly coordinated salts having a relatively low melting point such as, for example, less than 100° C. In certain embodiments as otherwise described herein, the ionic liquid comprises a compound of the formula $[A]_n^+[Y]_n^-$, where n is 1 or 2; $[A]^+$ is selected from a quaternary ammonium cation having the formula $[NR^1R^2R^3R]^+$, a phosphonium cation having the formula $[PR^1R^2R^3R]^+$, a sulfonium cation having the formula $[SR^1R^2R]+$, a guanidinium cation having the formula:

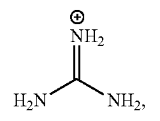

an imidazolium cation having the formula:

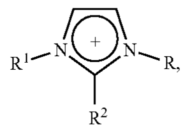

where the imidazole is optionally substituted with one or more groups selected from $C_1$-$C_6$ alkyl, $C_1$-$C_6$ alkoxy, $C_1$-$C_6$ aminoalkyl, $C_5$-$C_{12}$ aryl, and $C_5$-$C_{12}$ aryl-substituted $C_1$-$C_6$ alkyl, a pyridinium cation having the formula:

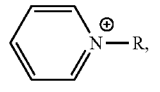

where the pyridine is optionally substituted with one or more groups selected from $C_1$-$C_6$ alkyl, $C_1$-$C_6$ alkoxy, $C_1$-$C_6$ aminoalkyl, $C_5$-$C_{12}$ aryl, and $C_1$-$C_6$ aryl-substituted $C_1$-$C_6$ alkyl, a pyrazolium cation having the formula:

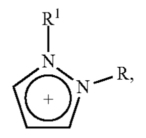

where the pyrazole is optionally substituted with one or more groups selected from $C_1$-$C_6$ alkyl, $C_1$-$C_6$ alkoxy, $C_1$-$C_6$ aminoalkyl, $C_5$-$C_{12}$ aryl, and $C_5$-$C_{12}$ aryl-substituted $C_1$-$C_6$ alkyl, and a triazolium cation having the formula:

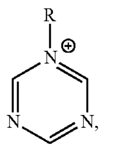

where the triazole is optionally substituted with one or more groups selected from $C_1$-$C_6$ alkyl, $C_1$-$C_6$ alkoxy, $C_1$-$C_6$ aminoalkyl, $C_5$-$C_{12}$ aryl, and $C_4$-$C_{12}$ aryl-substituted $C_1$-$C_6$ alkyl, where $R^1$, $R^2$ and $R^3$ are each independently hydrogen, $C_1$-$C_{20}$ alkyl, $C_3$-$C_8$ heteroaryl optionally substituted with one or more of $C_1$-$C_6$ alkyl and halogen, $C_3$-$C_6$ heteroaryl-substituted $C_1$-$C_6$ alkyl, the heteroaryl optionally substituted with one or more of $C_1$-$C_6$ alkyl and halogen, a polyether having the formula $[—CH_2CH_2O]_mR^a$ where m is within the range of 1-50,000 and $R^a$ is selected from $C_1$-$C_6$ alkyl, $C_5$-$C_{12}$ aryl optionally substituted with one or more of $C_1$-$C_6$ alkyl and halogen, and $C_5$-$C_{12}$ aryl-substituted $C_1$-$C_6$ alkyl, the aryl optionally substituted with one or more of $C_1$-$C_6$ alkyl and halogen, and where R is selected from $C_1$-$C_{20}$ alkyl, $C_4$-$C_8$ heteroaryl-substituted $C_1$-$C_6$ alkyl, the heteroaryl optionally substituted with one or more of $C_1$-$C_6$ alkyl and halogen, and $C_4$-$C_{12}$ aryl-substituted $C_1$-$C_6$ alkyl, the aryl optionally substituted with one or more $C_1$-$C_6$ alkyl and halogen; and $[Y]^-$ is selected from tetrafluoroborate ($[BF_4]^-$), hexafluorophosphate ($[PF_6]^-$), dicyanamide ($[N(CN)_2]^-$), halides ($Cl^-$, $Br^-$, $F^-$, $I^-$), hexafluoroantimonate ($[SbF_6]^-$), nitrate ($[NO_3]^-$), nitrite ($[NO_2]^-$), anionic metal complexes (e.g., $[CuCl_4]_2^-$, $[PdCl_4]_2^-$, $[AuCl_4]^-$), acetate ($[CH_3COO]^-$), trifluoracetate ($[F_3CCOO]^-$, hexafluoroarsenate ($[AsF_6]^-$), sulfate ($[SO_4]_2^-$), hydrogen sulfate ($[R'—SO_4]^-$), alkyl sulfate ($[R'—SO_4]^-$), tosylate ($[C_7H_7SO_3]^-$), triflate ($[CF_3SO_3]^-$), nonaflate ($[C_4F_9SO_3]^-$), triperfluoroethylene trifluorophosphate ($[PF_3(C_2F_5)_3]^-$), tricyanomethide ($[C(CN)_3]^-$), tetracyanoborate ($[B(CN)_4]^-$), thiocyanate ($[SCN]^-$), carbonate ($[CO_3]_2^-$), carboxylate ($[R'—COO]^-$), sulfonate ($[R'—SO_3]^-$), dialkylphosphate ($[R'PO_4R'']^-$), alkyl phosphonate ($[R'HPO_3]^-$), and bissulfonylimide ($[(R'—SO_2)_2N]^-$) (e.g., bis(trifluormethylsulfonyl)imide), where R' and R" are each independently linear or branched $C_1$-$C_{12}$ aliphatic or alicyclic alkyl, $C_5$-$C_{18}$ aryl, $C_5$-$C_{18}$ aryl-substituted $C_1$-$C_6$ alkyl, or $C_1$-$C_6$ alkyl-substituted $C_5$-$C_{18}$ aryl, the alkyl optionally substituted with one or more halogens.

In one embodiment, the ionic liquid is selected from 1-butyl-3-methylimidazolium triflate, 1-ethyl-3-methylpyridinium ethyl sulfate, 1-butyl-1-methylpyrrolidinium triflate, 1-butyl-2,3-dimethylimidazolium triflate, 1-butyl-3-methylimidazolium tricyanomethane, 1-butyl-3-methylimidazolium methyl sulfate, 1-butyl-3-methylimidazolium octyl sulfate, 1-butyl-3-methylimidazolium tetrafluoroborate, 1-ethyl-3-methylimidazolium ethyl sulfate, 1-ethyl-3-methylimidazolium methylphosphonate, 1-ethyl-3-methylimidazolium triflate, 1-butyl-1-methylpyrrolidinium bis(trifluoromethylsulfonyl)imide, 1-butyl-1-methylpyrrolidinium tetracyanoborate, 1-butyl-1-methylpyrrolidinium tris(pentafluoroethyl)trifluorophosphate, 1-butyl-3-methylimidazolium bis(trifluoromethylsulfonyl)imide, 1-butyl-3-methylimidazolium tricyanomethane, 1-ethyl-3-methylpyridinium bis(trifluoromethyl sulfonyl)imide, 1-ethyl-3-methylimidazolium tetracyanoborate, 1-ethyl-3-methylimidazolium tris (pentafluoroethyl)trifluorophosphate, 1-methyl-3-octylimidazolium triflate, ethyl dimethyl-(2-methoxyethyl) ammonium tris(pentafluoroethyl)trifluorophosphate, tributylmethylammonium dicyanamide, tricyclohexyltetradecylphosphonium tris(pentafluoroethyl)trifluorophosphate, 1-ethyl-3-methylimidazolium bis(trifluoromethylsulfonyl) imide and a mixture thereof.

In another embodiment, the protected base may be included in the one component epoxy resin-based composition in an amount within the range from about 0.1% by wt. to about 6% by wt., based on the total weight of the one component epoxy resin-based composition. In another embodiment, the protected base may be included in the one component epoxy resin-based composition in an amount within the range from about 0.5% by wt. to about 3% by wt. or from about 1% by wt. to about 2% by wt., based on the total weight of the one component epoxy resin-based composition.

The one component epoxy resin-based composition further includes a polyacid. The polyacid includes compounds having at least two reactive acid groups per molecule. The acid functionality can be a carboxylic acid or a sulfonic acid. In some embodiments, the polyacid comprises a carboxyl-terminated compound having at least two carboxyl groups per molecule. Examples of suitable polyacids include carboxylic acid group-containing polymers, such as acrylic polymers, polyesters, and polyurethanes; and oligomers, such as ester group-containing oligomers and monomers.

In one embodiment, the polyacid is a polyester of a phosphoric acid with acid groups and is a compound having the formula

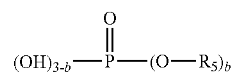

where b is 1 or 2 and $R_5$ is

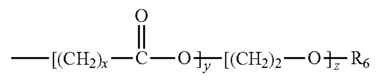

where $R_6$ is an alkyl group having 1 to 4 carbon atoms, x is an integer within a range from 4 to 5, y is an integer within a range from 2 to 15 and x is an integer within a range from 3 to 15.

The above numbers are averages and may be other than whole numbers. Such compounds may be produced according to the methods described in U.S. Pat. No. 5,130,463, the contents of which are incorporated by reference.

In one embodiment, the polyacid may be included in the one component epoxy resin-based composition in an amount within a range from about 0.05% by wt. to about 3% by wt., based on the total weight of the one component epoxy resin-based composition. In another embodiment, the polyacid groups may be included in the one component epoxy resin-based composition in an amount within the range from about 0.075% by wt. to about 1.5% by wt. or from about 0.1% by wt. to about 0.5% by wt., based on the total weight of the one component epoxy resin-based composition.

In further embodiments, the one component epoxy resin-based composition may include one or more additives including, but not limited to, plasticizers, extenders, pigments and dyes, such as carbon black, oxide colorants and titanium oxide, as well as flame retardants, antifoams, thixotropic agents (for e.g. fumed silicas or polyamides-types), flow control agents, adhesion promoters (for e.g. epoxy-silanes) and anti-oxidants (for e.g. sterically hindered phenols). Other additives may include fillers for example: metal powder, wood flour, glass powder, glass beads, semi-metal and metal oxides such as $SiO_2$ (silica sand, silica flour, silanized silica flour, synthetic silica flour, silanized synthetic silica flour), aluminium oxide, titan oxide and zircon oxide, metal hydroxide such as $Mg(OH)_2$, $Al(OH)_3$, silanized $Al(OH)_3$ and AlO(OH), semi-metal and metal carbides (SiC and boron carbide), semi-metal and metal nitrides (AlN and BN), metal carbonates (dolomite, chalk, $CaCO_3$), metal sulfides (barite, gypsum), rock flour such as from hydromagnesite and huntite and natural or synthetic minerals mainly from the silicate row such as zeolites (in particular molecular sieves), talc, mica, kaloin, wollastonite and others.

The additives may also contain fungicides, anti-foaming agents, anti-statics, lubricants, anti-precipitation agents, hydrophobic agents and demoulding agents.

The optional additives may also be selected from the group of toughening agents, e.g. CTBN-type tougheners, core-shell tougheners, block-copolymers (such as silicone-butyrolacton-type), and urethanes (e.g. phenol-terminated polyurethane adducts such as Flexibilizer DY 965 from Huntsman Advanced Materials).

The one component epoxy resin-based compositions according to this disclosure can be prepared by mixing the individual components in at room temperature or at slightly elevated temperatures and, if necessary, by means of suitable mills, e.g. ball mills or pin mills, kneaders or mixers.

According to another embodiment, the one component epoxy resin-based composition described above may be characterized in that the composition contains at least two of the following well-balanced properties: (1) a gel time of $<10$ min at 130° C.; (2) a viscosity of less than 60 mPas at 110° C.; (3) a storage stability of at least 6 months; and (4) is CMR-free with no H361 components. The gel time may be determined according to ISO 9396 (as described below). The viscosity may be determined with a plate/plate set up with 0.5 mm gap in oscillation mode with an angular frequency of 6.3 rad/s (equivalent to 1 Hz). Storage stability may be determined by comparing the viscosity of the composition at an initial time and at 6 months.

The curing of the presently disclosed one component epoxy resin-based compositions may be made by known manner. It can take place, in general, by heating the composition to temperatures within a range from about 50° C. to about 250° C., preferably from about 100° C. to about 180° C.

According to another embodiment, the one component epoxy resin-based composition described above may be characterized in that a resultant cured product formed by curing the composition contains at least two of the following well-balanced properties: (1) a glass transition temperature (Tg) of greater than about 160° C.; (2) a tensile strength of at least 70 MPa at ambient temperature; (3) a tensile modulus of at least 1.5 GPa at 140° C.; and (4) an elongation at break of at least 4% at ambient temperature and at 140° C. As used herein, a "cured product" refers to the curing of the one component epoxy resin-based composition whereby substantial networking or cross-linking occurs. Tensile strength, modulus and elongation at break may be determined according to ISO 527 (as described below). The glass transition temperature may be determined according to ISO 11357 (as described below).

Thus, according to another embodiment, there is provided a cross-linked product obtainable by curing the one component epoxy-resin based compositions.

According to still another embodiment, there is provided a packaged product comprising: a) a container having at least an outlet; and b) the one component epoxy resin-based composition of the present disclosure.

According to one embodiment, the packaged product of the present disclosure comprises a container having a closure means, such as a lid, cover, cap, or plug to seal the container. In another embodiment, the sealed container also has a nozzle or pour spout. The sealed container may have the shape of a cylinder, oval, round, rectangle, canister, tub, square or jug and contains the one component epoxy resin-based composition of the present disclosure.

In yet another embodiment, the container may be made from any material, such as steel, glass, aluminum, cardboard, tin-plate, plastics including, but not limited to, high density polyethylene (HDPE), polypropylene (PP), polyvinyl chloride (PVC), polyethylene terephthalate (PET), oriented polypropylene (OPP), polyethylene (PE) or polyamide and including mixtures, laminates or other combinations of these.

In still another embodiment there is provided a two-component composition comprising (a) a first component containing an epoxy resin and a reactive diluent; and (b) a second component containing a cyanoacetamide derived from a cycloaliphatic-type diamine and a polyoxyalkylene amine, a protected base in the form of an adduct or salt which can release a base upon heating at a temperature greater than about 50° C. and a polyacid. Alternatively, a two-component composition may comprise (a) a first component containing an epoxy resin and a reactive diluent, a protected base in the form of an adduct or salt which can release a base upon heating at a temperature greater than about 50° C. and a polyacid and (b) a second component containing a cyanoacetamide derived from a cycloaliphatic-type diamine and a polyoxyalkylene amine and an epoxy resin and a reactive diluent. One or more of the above-mentioned additives may be included in either part (a) or part (b).

The compositions disclosed herein may be useful in castings, pottings, encapsulation, coatings, composites, or laminates, more specifically, in electrical or electronic castings, electrical or electronic pottings, electrical or electronic encapsulation, electrical laminates, structural composites, or protective coatings. The compositions of the present disclosure may also be used in other various end-use applications including, for example, an adhesive for bonding first substrate to a second substrate, structural laminates, electrical laminates, coatings, castings, structures for the aerospace industry, as circuit boards and the like for the electronics industry, as well as for the formation of skis, ski poles, fishing rods, and other outdoor sports equipment. The compositions disclosed herein may also be used in electrical varnishes, encapsulants, semiconductors, filament wound pipe, storage tanks, liners for pumps, and corrosion resistant coatings, among others.

In yet another embodiment, there is also provided an article produced by curing the compositions of the present disclosure by application of heat. The article may include for example a casting, a potting, an encapsulation, a coating, an adhesive, a composite, or a laminate. The article may also include for example, a printed wire board, an electrical or electronic casting, an electrical or electronic potting, an electrical or electronic encapsulation, an electrical laminates, a structural composite, or a protective coating. The curing reaction of the compositions may be conducted at a temperature, generally, within a range from about 50° C. to about 250° C. or from about 100° C. to about 220° C. or from about 120° C. and about 180° C. The time of curing may be for a predetermined period of time which can range from minutes up to hours, generally the reaction time is more than about 5 minutes and less than about 24 hours, preferably between about 5 minutes and about 6 hours, and more preferably between about 5 minutes and about 2 hours. In other embodiments, curing may occur at a first temperature followed by a second temperature or post-treatment, such post-treatments ordinarily being at temperatures above 100° C. or above 140° C.

In one particular embodiment, there is provided the use of the one component epoxy resin-based composition as an impregnating and coating composition for electrical motors, transformers and generators (for e.g. the wound conductors of a stator, rotor, generator or transformer).

According to another embodiment, the one component epoxy resin-based composition of the present disclosure may be applied to a substrate by trickle impregnation, dip impregnation or vacuum impregnation. In some embodiments, the substrate may be one or more components of an electrical motor or generator, such as the coils or windings on conductor of a stator or rotor or transformer or the like. In still other embodiments, the substrate may comprise a primary insulation layer and the one component epoxy resin-based composition is applied onto the primary insulation layer by trickle impregnation, dip impregnation or vacuum impregnation. In still further embodiments, the primary insulation layer comprises polyether ether ketone (PEEK).

In trickle impregnation, the substrate is preheated to a temperature within a range from about 90° C. to about 110° C. for a period of time, such as within a range from about 60 minutes to about 120 minutes in an oven or by electrical current. The substrate is then rotated and the one component epoxy resin-based composition is trickled onto the rotating substrate, such as by using a suitable pump and nozzle, for a period of time, such as within a range from about 5 minutes to about 180 minutes depending on the size of the substrate to produce an impregnated substrate. The temperature is maintained within a range from about 90° C. to about 110° C. during impregnation. After impregnation, the impregnated substrate is then heated for gelation of the applied composition at a temperature within a range from about 100° C. to about 140° C. for a period of time, such as within a range of about 5 minutes to about 240 minutes. The impregnated substrate is then heated for final cure of the applied composition at a temperature within a range from about 140° C. to about 180° C. for a period of time, such as within a range from about 20 minutes to 720 minutes. The heat for gelation and final curing can be produced, for example, by passing an electrical current through the impregnated substrate or it is also possible to use an oven or an infrared (IR) or a near infrared radiation (NIR) source.

In dip impregnation, the substrate may be preheated in an oven or by electrical current to a temperature within a range from about 90° C. to about 140° C. The substrate is then fixed on an apparatus and dipped, while rotating, into an impregnating bath filled with the one component epoxy resin-based composition. After complete impregnation of the substrate, the substrate is removed from the impregnating bath while continuing to rotate and heated until the applied composition has gelled. In some embodiments, the impregnated substrate may then be heated for final cure of the applied composition at a temperature within a range from about 140° C. to about 180° C. for a period of time, such as within a range from about 20 minutes to about 720 minutes. The heat for gelation and final curing can be produced, for example, by passing an electrical current through the impregnated substrate while it is also possible to use an oven or an infrared (IR) or a near infrared radiation (NIR) source.

In vacuum impregnation, the substrate is heated to a temperature within a range from about 90° C. to about 110° C. for a period of time, such as within a range from about 60 minutes to about 120 minutes in an over or by electrical current. The substrate is then placed in a VPI vessel and vacuum is applied, such as within a range from about 0.5 mbar to about 5 mbar. The one component epoxy resin-based composition is then injected into the VPI vessel for a period of time, such as within a range from about 5 minutes to about 180 minutes depending on the size of the substrate to produce an impregnated substrate. After impregnation, the impregnated substrate is then heated for gelation of the applied composition at a temperature within a range from about 100° C. to about 140° C. for a period of time, such as within a range from about 5 minutes to about 240 minutes. The impregnated substrate is then heated for final cure of the applied composition at temperature within a range from about 140° C. to about 180° C. for a period of time, such as within a range of about 20 minutes to 720 minutes. The heat for gelation and final curing can be produced, for example, by passing an electrical current through the impregnated substrate while it is also possible to use an oven or an infrared (IR) or a near infrared radiation (NIR) source.

Thus, in still another embodiment there is provided a process of forming an impregnated substrate comprising the steps of: applying the one component epoxy resin-based composition of the present disclosure by dip impregnation, vacuum impregnation or trickle impregnation onto a substrate to form an impregnated substrate and curing the applied composition. In some embodiments, the substrate comprises a primary insulation layer, such as polyether ether ketone, and the one component epoxy-resin based composition is applied onto the primary insulation layer. In still another embodiment, there is provided a substrate, such as a wound conductor of a stator, rotor, transformer or generator, impregnated with the one component epoxy resin-based composition.

The present disclosure will now be further described with reference to the following non-limiting examples.

EXAMPLES

Example 1. One Component Epoxy Resin-Based Composition According to the Present Disclosure a) Preparation of a Cyanoacetamide Derived from a Norbornane-Type Diamine and a Polyoxyalkylene Amine:

671 grams of ethylcyanoacetate and 61.8 grams of Jeffamine® D-230 amine are charged into a glass reactor: The mixture is stirred and heated to an internal temperature (Ti) of about 40° C. At Ti=40° C., 350 grams of bicyclo[2.2.1] heptane bis(methylamine) is added to the mixture over a period of time of about 140 minutes. At the beginning of the addition of Pro-NBDA, Ti is increased from 40° C. to 80° C.

over a period of time of about 60 minutes. Once the addition of Pro-NBDA is completed, Ti is increased from 80° C. to 90° C. over a period of time of about 30 minutes and is then maintained for about 1 hour. The distillation of EtOH is then initiated by gently dropping the pressure to 50 mbar and heating the reactor jacket to 110° C. to maintain Ti around 90° C. Vacuum is switched to an $N_2$ atmosphere and the reaction mass temperature is increased to about 140° C. over a period of time of about 30 minutes. The distillation is set to reflux mode and Ti is maintained at about 140° C. until the residual amine content reaches a plateau (typical value 0.15-0.17 eq/Kg, approximate time range 4 hours). Ti is then increased from 140° C. to about 180° C. over a period of time of about 30 minutes. Ti is then maintained at about 180° C. until the residual amine content reaches <0.09 eq/Kg. While Ti is maintained at about 180° C., vacuum is applied (50 mbar) for about 30-60 minutes. The cyanoacetamide product is then discharged and filtered.

b) Preparation of the Composition According to the Present Disclosure 116.34 grams of the cyanoacetamide produced in a) is placed into a glass reactor vessel and the temperature was increased to 80° C.-100° C. in order to melt the product. 274.0 g of an epoxy resin (Araldite® GY 250: bisphenol-A diglycidyl-ether epoxy resin, epoxy equivalent of 180-190 g/eq) and 38.37 grams of a reactive diluent (DY 026 butanediol-diglycidylether) were added to the vessel and the mixture was stirred and then cooled to 30° C. 0.75 grams of a polyester of phosphoric acid with acid groups (BYK W9010 copolymer with acid groups), 5 grams of a master-batch solution of 1% TINOPAL OB optical brightener in an epoxy resin (Araldite® GY250 epoxy resin) and 16.1 grams of an epoxy resin (Araldite® G250 epoxy resin) were added to the vessel and the mixture was stirred. 7 grams of a protected base (FK EP 796-1: adduct based on 52% tris-dimethylaminophenol with 48% of a polyvinylphenol with an average molecular weight of 5000 g/mol, supplied as powder and having a D50<30 micron) was added to the vessel and the mixture was mixed with a high shear mixture. 50.2 grams of a reactive diluent (DY 026 butanediol-diglycidylether) was then added to the vessel and the mixture was mixed with a high shear mixture under vacuum to produce the composition.

c) Testing

Tensile strength and elongation at break were tested according to ISO 527. The composition of b) was poured into a mould (preheated to 110° C.) to prepare 4 mm thick plates and the mould was placed into an oven for 20 min at 110° C. than heated to 170° C. and kept at 170° C. for one hour. The mould was cooled down to room temperature slowly and the plates were de-moulded and cut to standard test specimen. ISO 527-2 was performed on a universal testing machine by applying a tensile force to a test specimen and the tensile strength, modulus and elongation at break were measured of the specimen under stress.

Gel time was measured according to ISO 9396. The composition was filled up to a level of 4 cm below the brim of a test vial, with the test vial being kept at a temperature of 25° C. or 40° C. A glass rod or a spindle was then moved up and down in the resin with 10 strokes per minute. The gel time is equivalent to the point of time at which the test vial was lifted by the oscillating rod.

The glass transition temperature (Tg) was determined by DSC according to ISO 11357-2 on samples prepared by above mentioned cure cycle. A sample of 10 mg was weighed out into a sample boat and introduced into a DSC instrument. Cooling took place to the start temperature, after which 1st and 2nd measuring runs were carried out with inert gas blanketing ($N_2$) at 50 ml/min, with a heating rate of 10 K/min, with cooling back to the start temperature between the runs. Measurement took place customarily in the temperature range from about 50° C. below the anticipated glass transition temperature to about 50° C. above the glass transition temperature. The glass transition temperature is that temperature in the 2nd measurement run at which half of the change in the specific heat capacity (0.5 delta cp) was reached. It is determined from the DSC diagram (plot of the heat flow against the temperature), and is the temperature at the point of intersection of the midline between the extrapolated baselines before and after the glass transition, and the measurement curve.

Viscosity was measured with a plate/plate setup with 0.5 mm gap in oscillation mode with an angular frequency of 6.3 rad/s (equivalent to 1 Hz) at 25° C. and 100° C.

COMPARATIVE EXAMPLES a) Comparative Example 1—a one-component epoxy resin composition according to Example 9 in US 2020/0223977 which included a cyanoacetamide derived from bis (aminomethyl)-tricyclo [ $5.2.1.0^{2.6}$] decane and did not include a cyanoacetamide derived from a polyoxyalkylene amine and a polyacid.

b) Comparative Example 2—a commercially available one component epoxy resin-based impregnation system (Damisolg3500 HiR system) that included a BX3NR3-type catalyst.

c) Comparative Example 3—a commercially available polyesterimide-based impregnation system (MF 8044 system).

d) Comparative Example 4—a commercially available one component epoxy resin-based impregnation system (XD 4410 system) that included a BX3NR3-type catalyst.

e) Comparative Example 5—a commercially available impregnation system (CY 5841 system) based on Bis A/F epoxy resin, reactive diluent and trichloro(N,N-dimethyloctylamine)boron.

f) Comparative Example 6—an epoxy resin composition according to Example 1 in US 2015/0002254 which included an epoxy resin cured with dicyandiamide and (2,4-bis(N1,N1-dimethylureido)toluene).

Results

| Property | Comp. Ex 1 | Comp. Ex. 2 | Comp. Ex. 3 | Comp Ex. 4. | Comp. Ex. 5 | Comp. Ex. 6 | Ex. 1 |
|---|---|---|---|---|---|---|---|
| $T_g$ (° C.) | 120 | 122 | <155 | 120 | 120 | 118 | 168 |
| Storage Stability (months) | <1 (crystallization) | 12 | 12 | >6 | >6 | <1 | >6 |
| Viscosity | >100 (at | <100 | <100 | 10 | <100 | 70 (at | 60 (at |

-continued

| Property | Comp. Ex 1 | Comp. Ex. 2 | Comp. Ex. 3 | Comp Ex. 4. | Comp. Ex. 5 | Comp. Ex. 6 | Ex. 1 |
|---|---|---|---|---|---|---|---|
| (mPas) | 110° C.) | | | | | 60° C.) | 110° C.) |
| Gel time at 130° C. (minutes) | ca 10 | 5 | 5.5 (at 120° C.) | 80 | 25 | 22 (at 120° C.) | 8 |
| Impregnation Capability | Fail | Good | Good | Good | Good | Fail | Good |
| Adhesion to PEEK | Partly | Good | Fail | Good | Good | Good | Good |
| Tensile Strength (Mpa) | — | — | — | 45 | 30 | 76 | 80 |
| Elongation at Break (%) | — | — | — | 1 | 1.25 | 4 | 6 |
| CMR, H361 Free | Yes | No | Yes | Yes | No | Yes | Yes |

As shown above, although Comparative Example 1 is chemically latent and fast reactive at 130° C. as desired, it is not suitable for impregnation because of its high viscosity. At conditions where the viscosity is lower, for e.g. at T=40° C. or incorporation of reactive diluents, it will tend to crystallize. Further its Tg is too low for high temperature applications. Comparative Example 2 is a typically used epoxy-based homopolymerisation type reactive impregnation system with overall good performance for trickle impregnation, such as low viscosity, latency and high reactivity. However, it contains CMR components with H361 label and its Tg is too low for high temperature applications. Comparative Example 3 is a polyesterimide-based impregnation system and typically used for trickle impregnation. While this system is CMR-free and its reactivity and storage stability are sufficient, it does not adhere well to primary insulation materials (PEEK). Furthermore, its Tg is less than 155° C. limiting its use high temperature applications. Comparative example 4 is a homopolymerisable epoxy-based system with good adherence to primary insulation materials and is not tox-critical. However, its reactivity is too slow and its Tg is too low for high temperature applications. Comparative Example 5 is also a homopolymerisable epoxy-based system with good adherence to primary insulation materials, however it is tox-critical. Furthermore, its reactivity is too slow and the Tg is too low for high temperature applications. Comparative Example 6 is an epoxy system having a Tg and reactivity that are too low. Another disadvantage of this system is the presence of solid dicyandiamide particles, that could lead to filtration effects preventing proper impregnation and cure of the material between the wires. Inventive Example 1 solves all problems mentioned above: it offered a high Tg (>160° C.), is storage stable as one-component system for a minimum of 6 months, is fast curing at 130° C. (<10 min), impregnates well thanks to low viscosity and good wettability/adherence to thermoplastic primary insulation materials (such as PEEK) and is not tox-critical.

Although making and using various embodiments of the present invention have been described in detail above, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

The invention claimed is:

1. A one-component epoxy resin-based composition comprising: (a) an epoxy resin; (b) a reactive diluent; (c) a cyanoacetamide derived from a cycloaliphatic-type diamine and a polyoxyalkylene amine; (d) a protected base in the form of an adduct or salt which can release a base upon heating at a temperature greater than about 50° C.; and (e) a polyacid.

2. The one-component epoxy-resin based composition of claim 1, wherein the cycloaliphatic-type diamine is norbornane-type diamine having the formula

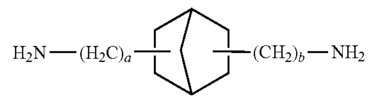

where a and b are each an integer from 0 to 2 with the proviso that a+b=2.

3. The one component epoxy resin-based composition of claim 2, wherein the norbornane-type diamine is 2,5-bis(aminomethyl)norbornane or 2,6-bis(aminomethyl)norbornane or a mixture thereof.

4. The one component epoxy resin-based composition of claim 2, wherein the polyoxyalkylene amine is a polyoxyalkylene diamine compound having a formula

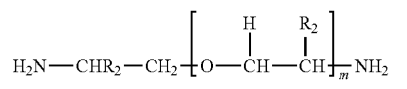

where m is an integer of 2 to about 100 and each $R_2$ is independently hydrogen, methyl or ethyl, wherein each $R_2$ is independently hydrogen or methyl and m is an integer of 2 to about 70.

5. The one component epoxy resin-based composition of claim 1, wherein the polyacid is a polyester of a phosphoric acid with acid groups having the formula

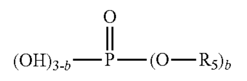

where b is 1 or 2 and $R_5$ is

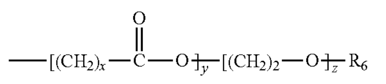

where $R_6$ is an alkyl group having 1 to 4 carbon atoms, x is an integer within a range from 4 to 5, y is an integer within a range from 2 to 15 and x is an integer within a range from 3 to 15.

6. The one component epoxy resin-based composition of claim 1, wherein the reactive diluent is an epoxy reactive diluent.

7. The one component epoxy-resin based composition of claim 1, wherein the protected base is in the form of an adduct of a tertiary amine and a phenol.

8. The one component epoxy resin-based composition of claim 7, wherein the adduct of the tertiary amine and the phenol has an average particle size D50 of less than 30 microns.

9. The one component epoxy-resin based composition of claim 1, wherein the protected base is an ionic liquid.

10. The one component epoxy resin-based composition of claim 1, wherein (a) the epoxy resin is present in an amount within a range from about 40% by wt. to about 70% by wt>;

(b) the reactive diluent is present in an amount within a range from about 10% by wt. to about 40% by wt.;

(c) the cyanoacetamide derived from a cycloaliphatic-type diamine and a polyoxyalkylene amine is present in an amount within a range from about 10% by wt. to about 40% by wt.;

(d) the protected base in the form of an adduct or salt is present in an amount within a range from about 0.1% by wt. to about 6% by wt.; and (e) the polyacid is present in an amount within a range from about 0.05% by wt. to about 3% by wt., where the % by wt. is based on the total weight of the one component epoxy resin-based composition.

11. A packaged product comprising a) a container having at least an outlet; and b) the one component epoxy resin-based composition of claim 1.

12. The packaged product of claim 11, wherein the one component epoxy-resin based composition of claim 1 has a storage stability of at least 6 months.

13. Use of the one component epoxy resin-based composition of claim 1 to impregnate, protectively coat, or adhere an electrical or electronic casting, an electrical or electronic potting, an electrical or electronic encapsulation, an electrical laminate or a structural composite.

14. Use of the one-component epoxy-resin based composition of claim 1 as an adhesive for bonding a first substrate to a second substrate.

15. Use of the one-component epoxy-resin based composition of claim 1 as an impregnating or coating composition for electrical motors, transformers, and generators.

16. A process of forming an impregnated substrate comprising the steps of applying the one component epoxy resin-based composition of claim 1 onto a substrate by dip impregnation, vacuum impregnation, or trickle impregnation to form an impregnated substrate and curing the applied composition.

17. The process of claim 16, wherein the substrate comprises a primary insulation layer comprising polyether ether ketone and the one component epoxy-resin based composition is applied onto the primary insulation layer.

18. The process of claim 17, wherein the substrate is a wound conductor of a rotor or stator.

* * * * *